(12) United States Patent
Chen

(10) Patent No.: US 7,566,104 B2
(45) Date of Patent: Jul. 28, 2009

(54) BI-DIRECTIONAL SIDE EMPLACING COMPUTER CASING

(75) Inventor: Deng-Hsi Chen, Keelung (TW)

(73) Assignee: Lian Li Industrial Co., Ltd., Keelung (TW)

( * ) Notice: Subject to any disclaimer, the term of this patent is extended or adjusted under 35 U.S.C. 154(b) by 361 days.

(21) Appl. No.: 11/429,189

(22) Filed: May 8, 2006

(65) Prior Publication Data

US 2007/0256990 A1 Nov. 8, 2007

(51) Int. Cl.
*G06F 1/16* (2006.01)
(52) U.S. Cl. .................. 312/223.2; 361/727
(58) Field of Classification Search .............. 312/223.1, 312/223.2; 361/724–727, 683–685, 719, 361/679.02, 679.31–679.33, 679.37–679.41, 361/679.48, 679.6
See application file for complete search history.

(56) References Cited

U.S. PATENT DOCUMENTS

| | | | | |
|---|---|---|---|---|
| 5,235,493 A * | 8/1993 | Yu | ........ | 361/685 |
| 5,867,369 A * | 2/1999 | Antonuccio et al. | ......... | 361/796 |
| 6,055,152 A * | 4/2000 | Felcman et al. | ............. | 361/683 |
| 6,078,504 A * | 6/2000 | Miles | ......... | 361/727 |
| 6,272,007 B1 * | 8/2001 | Kitlas et al. | ......... | 361/683 |
| 6,341,060 B1 * | 1/2002 | Chuang | ........ | 361/685 |
| 6,382,744 B1 * | 5/2002 | Xiao | ........ | 312/223.2 |
| 6,522,547 B1 * | 2/2003 | Diaz et al. | ........ | 361/724 |
| 6,714,406 B2 * | 3/2004 | Chen | ........ | 361/683 |
| 7,050,298 B2 * | 5/2006 | Chen | ........ | 361/685 |
| 7,116,551 B2 * | 10/2006 | Erickson et al. | ........ | 361/679.32 |
| 7,265,972 B2 * | 9/2007 | Chien et al. | ........ | 361/679.33 |
| 7,324,338 B1 * | 1/2008 | Chi et al. | ........ | 361/695 |
| 2004/0085725 A1 * | 5/2004 | Liu | ........ | 361/685 |
| 2005/0088807 A1 * | 4/2005 | Wu | ........ | 361/679 |
| 2005/0122675 A1 * | 6/2005 | Cheng | ........ | 361/685 |
| 2006/0187627 A1 * | 8/2006 | Kobayashi | ........ | 361/685 |
| 2007/0230104 A1 * | 10/2007 | Chen et al. | ........ | 361/685 |
| 2007/0275650 A1 * | 11/2007 | Chen | ........ | 454/184 |

* cited by examiner

*Primary Examiner*—Janet M Wilkens
(74) *Attorney, Agent, or Firm*—Troxell Law Office, PLLC

(57) ABSTRACT

A bi-directional side emplacing computer casing includes a cage, two side boards, and an expansion rack. Openings of the expansion rack are facing toward a left side and a right side to the cage respectively, and its two side walls are provided with plural sets of symmetric sliding grooves extended inward from the openings at two sides. The symmetric sliding grooves are not interconnected, so as to provide for a sliding and an insertion of expansion equipment having roller screws. In addition, the two side boards are all provided with expansion holes corresponding to the expansion rack, such that the expansion equipment can be emplaced at any side of the computer casing to be in compliance with a requirement of an operator.

4 Claims, 5 Drawing Sheets

BI-DIRECTIONAL SIDE EMPLACING COMPUTER CASING

BACKGROUND OF THE INVENTION (a) Field of the Invention

The present invention relates to a bi-directional side emplacing computer casing, and more particularly to a computer casing wherein its two sides can be both used for emplacing expansion equipment such as a floppy disk drive, a CD-ROM disk drive, or a burner, so as to be in compliance with a requirement of an operator.

(b) Description of the Prior Art

As a popularity of computer technology, almost every house is provided now with a personal computer for use, and the ordinary personal computer is composed of a computer host and a monitor, wherein the computer host is provided with all kinds of electronic parts which are installed in a computer casing. The most primary object of computer casing is to protect the interior electronic parts from being interfered by ambient conditions, and is also to protect ambient objects from being damaged by a radiation or an electromagnetic wave of the electronic parts. Referring to FIG. 1, the most common computer casing is constituted by a plurality of metallic side boards a which are installed on a computer cage b by directly screwing the two metallic side boards a on openings at two sides of the computer cage b, respectively. On the other hand, a front face and a rear face of the computer cage b are provided with a decoration board b1 and an emplacement board b2, respectively, and an interior of the computer cage b is installed with an emplacement rack b3 for a variety of expansion equipment which is usually assembled on the computer cage b directly. Therefore, most of the computer casings to be seen will be usually provided with openings used for the expansion equipment such as the floppy disk drive, the CD-ROM disk drive, or the burner on the front face; whereas, when installing the expansion equipment, one of the side boards b of computer casing will be opened to emplace each expansion equipment one by one onto its corresponding emplacement rack b3. However, as an interior of computer casing has been already installed with fixed electronic parts such as a motherboard, a memory, a central processing unit, and a power source, the interior space will be limited. Furthermore, in using this kind of computer casing, positions of the front openings will usually be moved and adjusted to be in cooperation with a habit of an operator or a requirement of space, which will often cause an inconvenience in operation; therefore it is necessary to be improved.

Accordingly, in lieu of the shortcomings in using the ordinary computer casing, a brand new bi-directional side emplacing computer casing is invented, wherein openings at two faces of an expansion rack are exposed at two sides of a cage respectively, plural sets of symmetric sliding grooves are installed between side walls along the openings at two sides of the expansion rack respectively, and roller screws which are corresponding to the aforementioned sliding slots are installed on expansion equipment such as a floppy disk drive, a CD-ROM disk drive, or a burner, such that the aforementioned expansion equipment can be emplaced at the other side of present invention according to a requirement of an user. On the other hand, side boards which are provided with openings corresponding to the expansion equipment can be used both with their two sides and therefore can be used to quickly change directions and positions for emplacing the expansion equipment into the computer casing.

SUMMARY OF THE INVENTION

The primary object of present invention is to provide a computer casing, two sides of which can be both used for emplacing expansion equipment, thereby quickly changing directions and positions for emplacing the expansion equipment into the computer casing, to be in compliance with a requirement of an operator.

Another object of the present invention is to provide a computer casing which is convenient to be disassembled and can facilitate an expansion of all kinds of equipment, thereby reducing a possibility of collision between interior electronic parts.

Accordingly, the bi-directional side emplacing computer casing of present invention comprises primarily a cage, two side boards, as well as an expansion rack, a motherboard rack, and a hard disk rack inside the cage, wherein the expansion rack is installed at a position close to a front face of the cage with its openings facing toward a left side and a right side to the cage respectively, and its two side walls are provided with plural sets of symmetric sliding grooves extended inward from the openings at two sides. The symmetric sliding grooves are not interconnected, so as to provide for a sliding and an insertion of expansion equipment which is installed with roller screws. In addition, the two side boards are provided with an expansion hole corresponding to the expansion rack respectively, and fixing holes at peripheries of the side boards can be used both with two sides. Furthermore, the motherboard rack is sliding and inserted into the sliding slot at a bottom face of the cage from a lower part of rear face of the cage, the hard disk rack is emplaced from an opening at a top part of rear face of the cage, and back panels of the aforementioned motherboard rack and the hard disk rack are all directly screwed at the rear face of the cage.

Accordingly, when using the aforementioned structures, the expansion equipment such as the floppy disk drive, the CD-ROM disk drive, or the burner is selectively installed at one side of the computer casing according to the requirement of operator, and the roller screws of aforementioned expansion equipment are sliding and inserted into the sliding slot at a proper side of the expansion rack, next a signal line of expansion equipment is connected with the motherboard, so as to be connected with a power cord extended from a power supply, finally the two side boards are sealed at the left and right sides of the cage, respectively, and the corresponding expansion hole on the side board is opened to expose a front panel of the disk drive. Moreover, the motherboard rack and the hard disk drive are installed respectively at proper positions at an upper and a lower parts of the rear face of the cage, without being interfered with each other upon disassembling. Therefore, the computer casing of present invention is convenient to be disassembled, and can facilitate an expansion of all kinds of equipment, thereby reducing a possibility of collision between the interior electronic parts.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
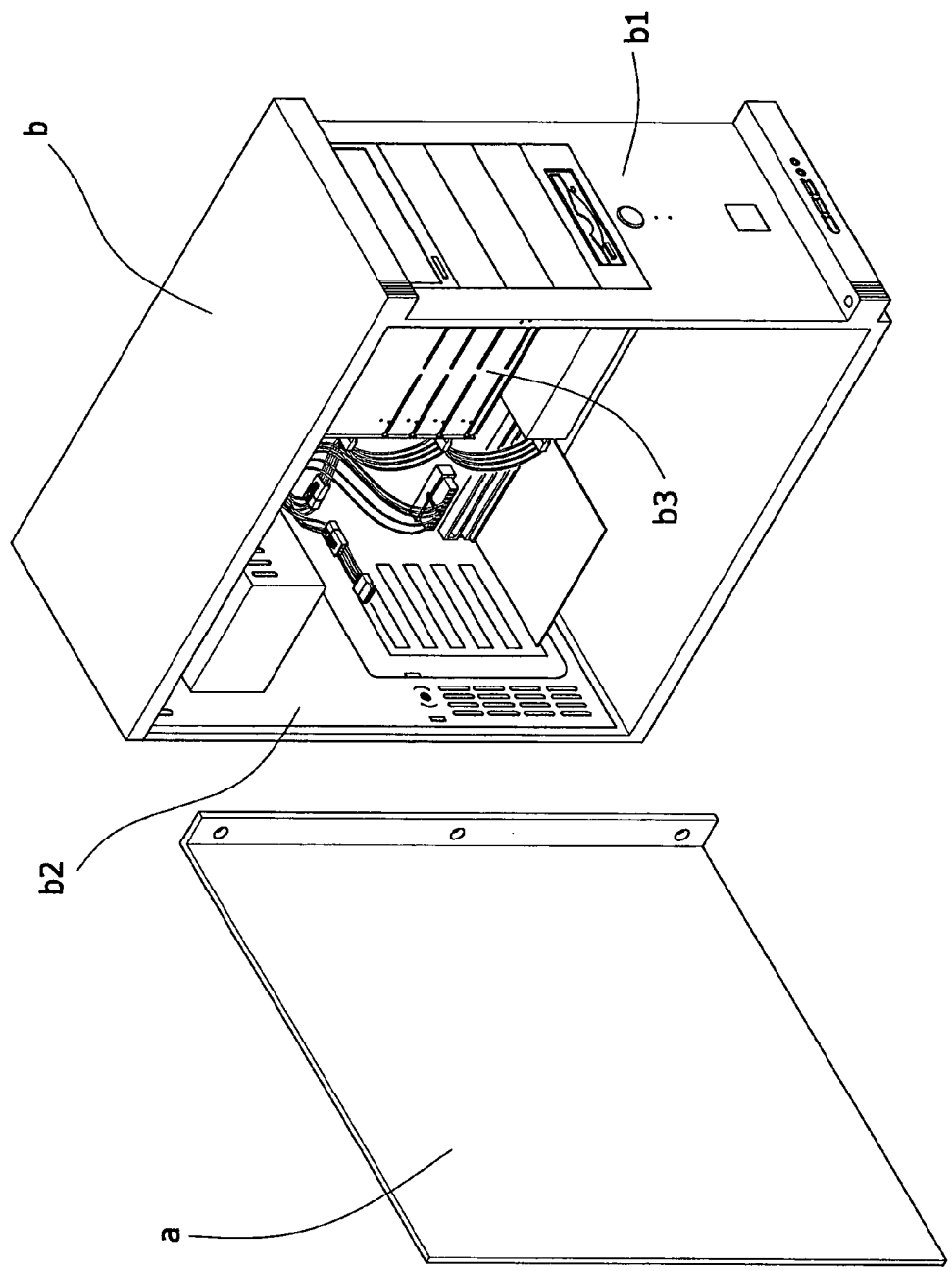
FIG. 1 shows a schematic view of a structure of a conventional computer casing.
Figure 2:
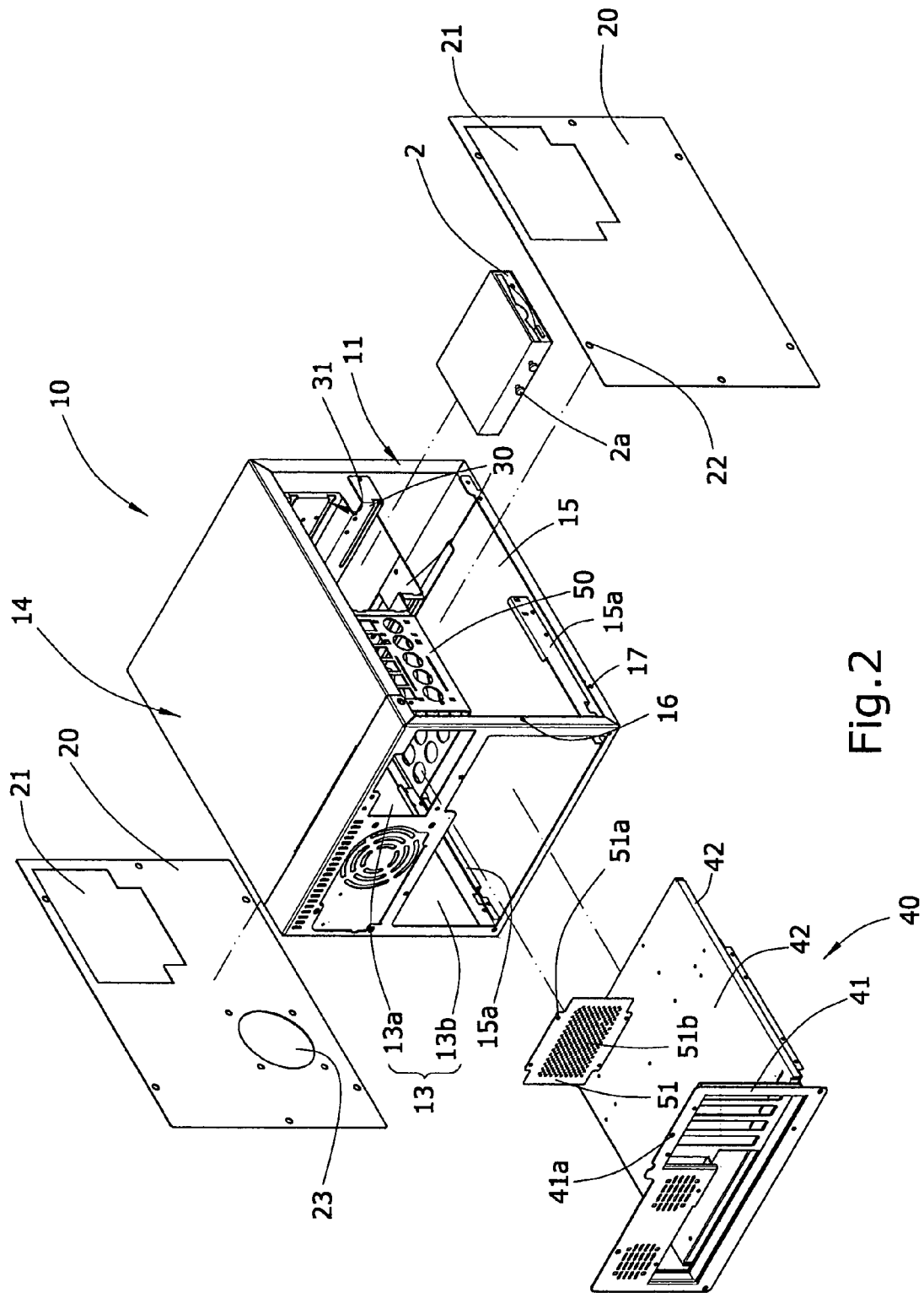
FIG. 2 shows an exploded view of the present invention.
Figure 3:
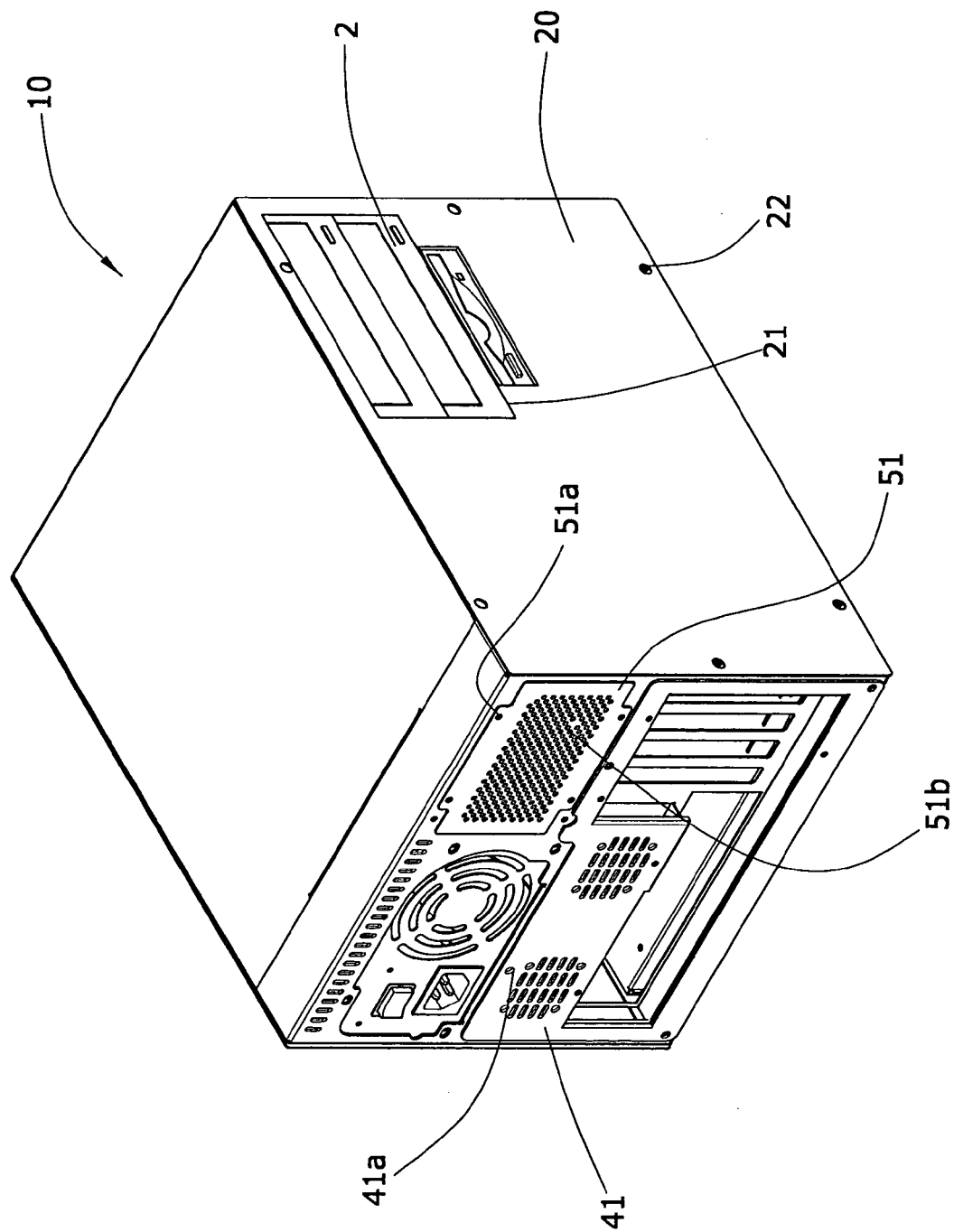
FIG. 3 shows a schematic view of the present invention after being assembled.

Referring to FIG. 2 and FIG. 3, the present invention is primarily composed of a cage 10, two side boards 20, as well as an expansion rack 30, a motherboard rack 40, and a hard disk rack 50 inside the cage 10.

The cage 10 is a rectangular body constituted by a plurality of frameworks 11, a front position of which is provided with a front panel 12, a rear position of which is provided with a back panel 13, and an upper and a lower parts of which are provided with a top board 14 and a bottom board 15 respectively, thereby forming a body with two hollow sides. In addition, peripheries at two sides of the cage 10 are provided with a plurality of positioning holes 16 and screw holes 17 for positioning the side boards 20, an upper part of the back panel 13 is provided with an opening 13a for emplacing the hard disk rack 50, a lower part of the back panel 13 is provided with an opening 13b for emplacing the motherboard rack 40, and proper positions at two sides of the bottom board 15 are installed with sliding slots 15a.

The two side boards 20 are made into a size and a shape corresponding to the hollow faces at two sides of the cage 10, and the side boards 20 are all provided with expansion holes 21 corresponding to the expansion rack 30. Peripheries of the side boards 20 are all installed with fixing holes 22 corresponding to the screw holes 17 on the cage 10. Furthermore, one of the side boards 20 is provided with an emplacement hole 23 for installing a fan for dissipating heat.

The expansion rack 30 is installed at a position close to a front face of the cage 10, and its openings are facing toward a left side and a right side to the cage 10, respectively. In addition, its two side walls are provided with plural sets of symmetric sliding grooves 31 extended inward from the openings at two sides, and the symmetric sliding grooves 31 are not interconnected, so as to provide for a sliding and an insertion of expansion equipment 2 which is provided with roller screws 2a.

The motherboard rack 40 is composed of a back panel 41 and a lower sliding board 42, which is roughly in an L-shape upon being viewed from a side. Peripheries of the back panel 41 are provided with a plurality of fixing holes 41a, a proper position at a center of the back panel 41 is provided with an opening 41a for transfixing a motherboard and connection ports of interface cards, and two sides of the lower sliding board 42 are provided with proper sliding pieces 42a which can be sliding and inserted into the sliding slots 15a at the bottom face of cage 10.

The hard disk rack 50 is constituted by a back panel 51 and a rack 52 which can be emplaced with multiple hard disks, peripheries of the back panel 51 are provided with a plurality of positioning holes 51a, and the back panel 51 is provided with a plurality of heat dissipating holes 51b. When installing the hard disk rack 50, it is emplaced into the corresponding opening 13a on the back panel 13 of cage 10 and is fixed.

Figure 4:
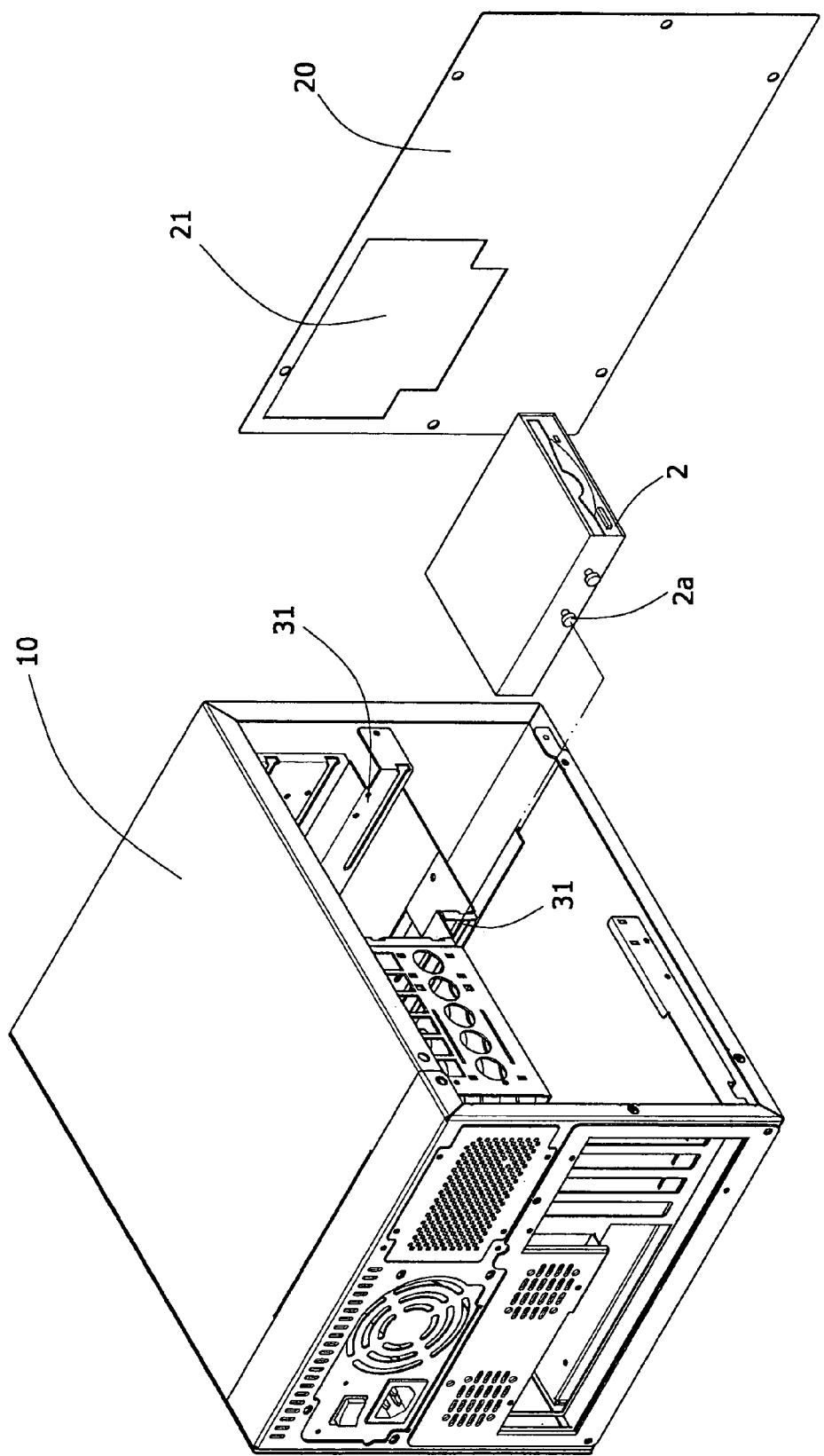
FIG. 4 shows a schematic view of using the present invention.
Figure 5:
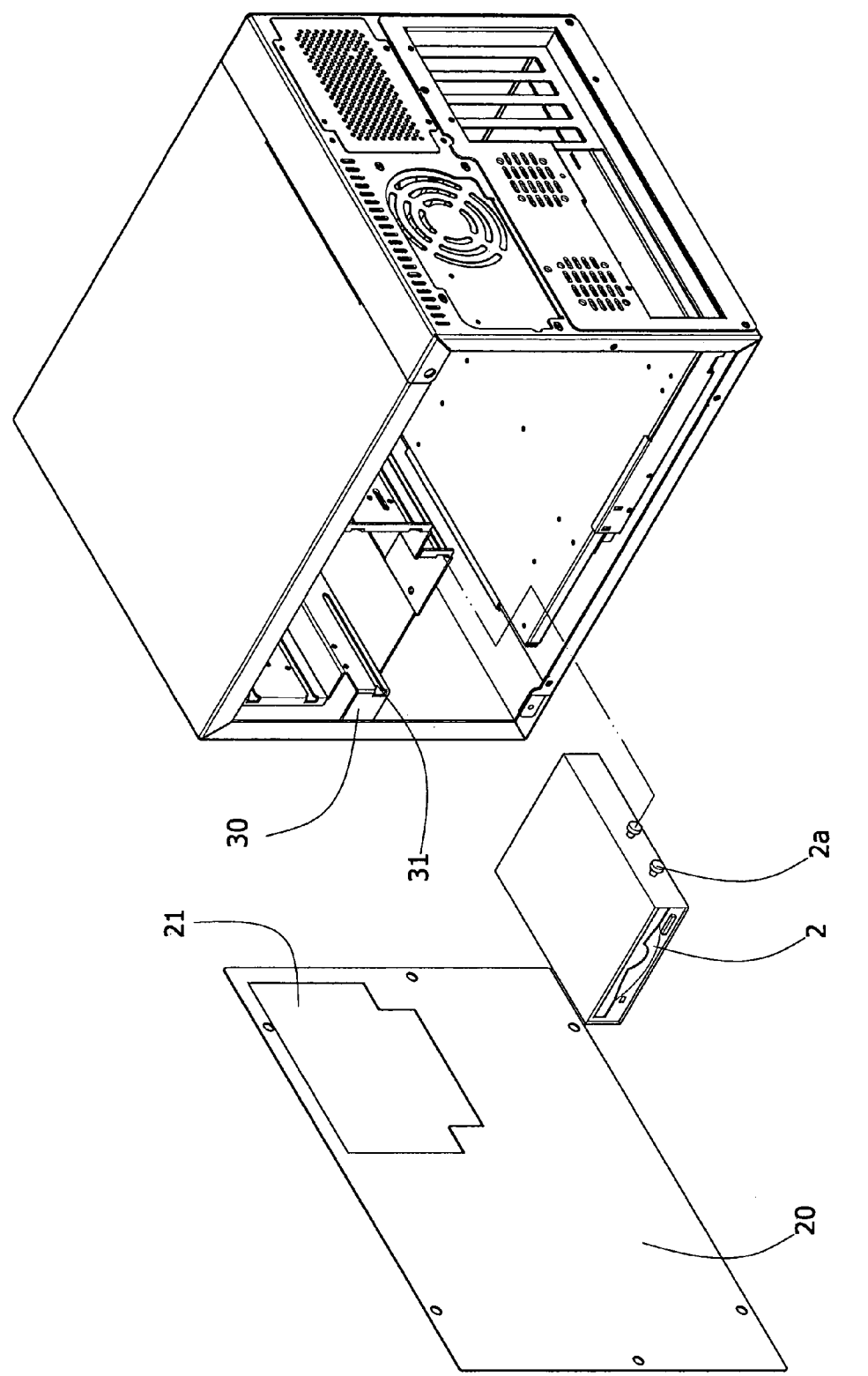
FIG. 5 shows a second schematic view of using the present invention.

Referring to FIG. 4 and FIG. 5, the expansion equipment 2 such as the floppy disk drive, the CD-ROM disk drive, or the burner is selectively installed at one side of the computer casing according to a requirement of an operator, and the roller screws 2a of the aforementioned expansion equipment 2 are sliding and inserted into the sliding groove 31 at a proper side of the expansion rack 30, then a signal line of expansion equipment 2 is connected to a motherboard so as to be connected to a power cord extended from a power supply, and finally the two side boards 20 are sealed at a left side and a right side to the cage 10, respectively. If a direction needs to be changed, the signal line of expansion equipment 2 is disconnected from the power cord, and the expansion equipment 2 is removed, re-sliding and reinserted into the sliding groove 31 at an opening of the other side of the expansion rack 30, then the signal line is reconnected to the power cord, finally the expansion hole 21 at the other side board 20 is opened, but the expansion hole 21 at the original side board 20 is closed, so as to expose a front panel of the disk drive, thereby achieving the objects of quickly changing the direction and position for emplacing the expansion equipment 2 into the present invention.

Accordingly, the two sides of the bi-directional side emplacing computer casing of present invention can be both used for emplacing the expansion equipment, so as to quickly change the direction and position for emplacing the expansion equipment into the computer casing, thereby being in compliance with the requirement of an operator. Furthermore, the motherboard rack and the hard disk rack are convenient to be disassembled, thereby facilitating an expansion of all kinds of equipment and reducing a possibility of collision between the interior electronic parts.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A bi-directional side emplacing computer casing including a cage, two side boards, as well as an expansion rack, a motherboard rack, and a hard disk rack inside the cage, wherein the cage is a rectangular body constituted by a plurality of frameworks, a front position of which is provided with a front panel, a rear position of which is provided with a back panel, and an upper and a lower parts of which are provided with a top board and a bottom board respectively to form a body with two hollow sides; peripheries at two sides of the cage being provided with a plurality of positioning holes and screw holes to position the side boards; an upper part of the back panel being provided with an opening located adjacent to the hard disk rack, a lower part of the back panel being provided with an opening configured to hold the motherboard rack, and proper positions at two sides of the bottom board being installed with sliding slots; the two side boards being made into a size and a shape corresponding to the hollow faces at two sides of the cage, and the side boards being all provided with expansion holes corresponding to the expansion rack; peripheries of the side boards being all installed with fixing holes corresponding to the screw holes on the cage; the expansion rack being installed at a position close to a front face of the cage, and its openings facing toward a left side and a right side to the cage, respectively; two side walls of the expansion rack being provided with plural sets of symmetric sliding grooves extended inward from the openings at two sides, and the symmetric sliding grooves not being interconnected, the symmetric sliding groves being configured for a sliding and an insertion of expansion equipment having roller screws; the motherboard rack being composed of a back panel and a lower sliding board, and being roughly in an L-shape upon being viewed from a side; peripheries of the back panel being provided with a plurality of fixing holes, a proper position at a center of the back panel being provided with an opening to transfix a motherboard and connection ports of interface cards, and two sides of the lower sliding board being provided with proper sliding pieces which can be sliding and inserted into the sliding slots at the bottom face of cage; the hard disk rack being constituted by a back panel and a rack configured to hold multiple hard disks, peripheries of the back panel being provided with a plurality of positioning holes, and the back panel being provided with a plurality of heat dissipating holes.

2. The bi-directional side emplacing computer casing according to claim 1, wherein the motherboard is horizontally laid on the front face of the lower sliding board of the motherboard rack.

3. The bi-directional side emplacing computer casing according to claim 1, wherein the hard disk rack is emplaced into the corresponding opening on the back panel of cage and is fixed.

4. The bi-directional side emplacing computer casing according to claim 1, wherein one of the side boards is provided with an emplacement hole for installing a fan to dissipate heat.

* * * * *